United States Patent [19]

Onishi et al.

[11] Patent Number: 5,317,581
[45] Date of Patent: May 31, 1994

[54] ELECTRIC FIELD ABSORPTION LIGHT MODULATION DRIVING APPARATUS AND METHOD HAVING IMPROVED FEATURE TO ELIMINATE NOISE FROM OPTICAL OUTPUT

[75] Inventors: Masaru Onishi; Kazuhiro Suzuki, both of Kawasaki, Japan

[73] Assignee: Fujitsu Limited, Japan

[21] Appl. No.: 968,444

[22] Filed: Oct. 29, 1992

[30] Foreign Application Priority Data

Oct. 31, 1991 [JP] Japan .................................. 3-286142

[51] Int. Cl.⁵ .................... H01S 3/10; H04B 10/04; G02F 1/01; G02F 1/29; G02F 1/29
[52] U.S. Cl. ............................... 372/38; 372/33; 359/180; 359/181; 359/276; 359/320; 455/106
[58] Field of Search ............... 359/245, 276, 320, 180, 359/181, 184, 185, 186; 372/38, 33, 26; 385/1, 2; 250/205; 455/107, 106

[56] References Cited

U.S. PATENT DOCUMENTS 5,208,817  5/1993  Kao et al. ................................ 385/1

FOREIGN PATENT DOCUMENTS 0052022  4/1980  Japan ................................... 359/276

OTHER PUBLICATIONS

Noda et al., "High-Speed Electroabsorption Modulator with Strip-Loaded GaInAsP Planar Waveguide", Journal of Lightwave Technology, Oct. 1986, vol. 4, No. 10, pp. 1445-1453.

Tanaka et al., "5-Gb/s Performance of Integrated Light Source Consisting of λ/4-Shifted DFB Laser and EA Modulator with SI InP Structure", Journal of Lightwave Technology, Sep. 1990, vol. 8, No. 9, pp. 1357-1362.

Mitomi et al., "Chirping Characteristic and Frequency Response of MQW Optical Intensity Modulator", Journal of Lightwave Technology, Jan. 1992, vol. 10, No. 1, pp. 71-77.

Primary Examiner—Rodney B. Bovernick
Assistant Examiner—Robert McNutt
Attorney, Agent, or Firm—Greer, Burns & Crain, Ltd.

[57] ABSTRACT

An electric field absorption light modulation unit includes a light emission device for emitting light and a modulation device for varying a light transmittance thereof of light applied by the light emission device so as to provide the light as a result of modifying thereof. A driving signal generating unit coupled with the electric field absorption light modulation unit generates a driving signal to be applied to the modulation device from an input information signal by making the modulation device vary the light transmittance thereof, and the driving signal generating unit provides the driving signal so that the driving signal in a fluctuation range in which an undesirable level fluctuation may be present, corresponds to a constant working range of the modulation device, the light transmittance thereof staying at a constant value in the constant working range.

20 Claims, 6 Drawing Sheets

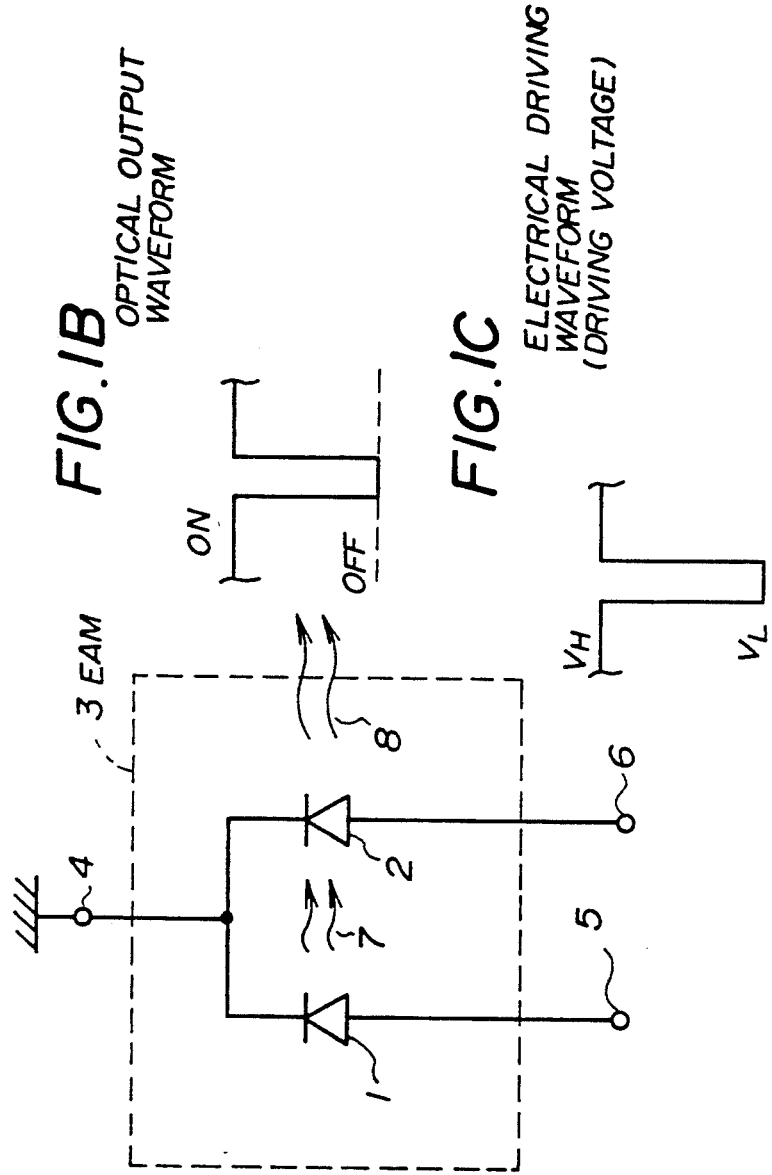

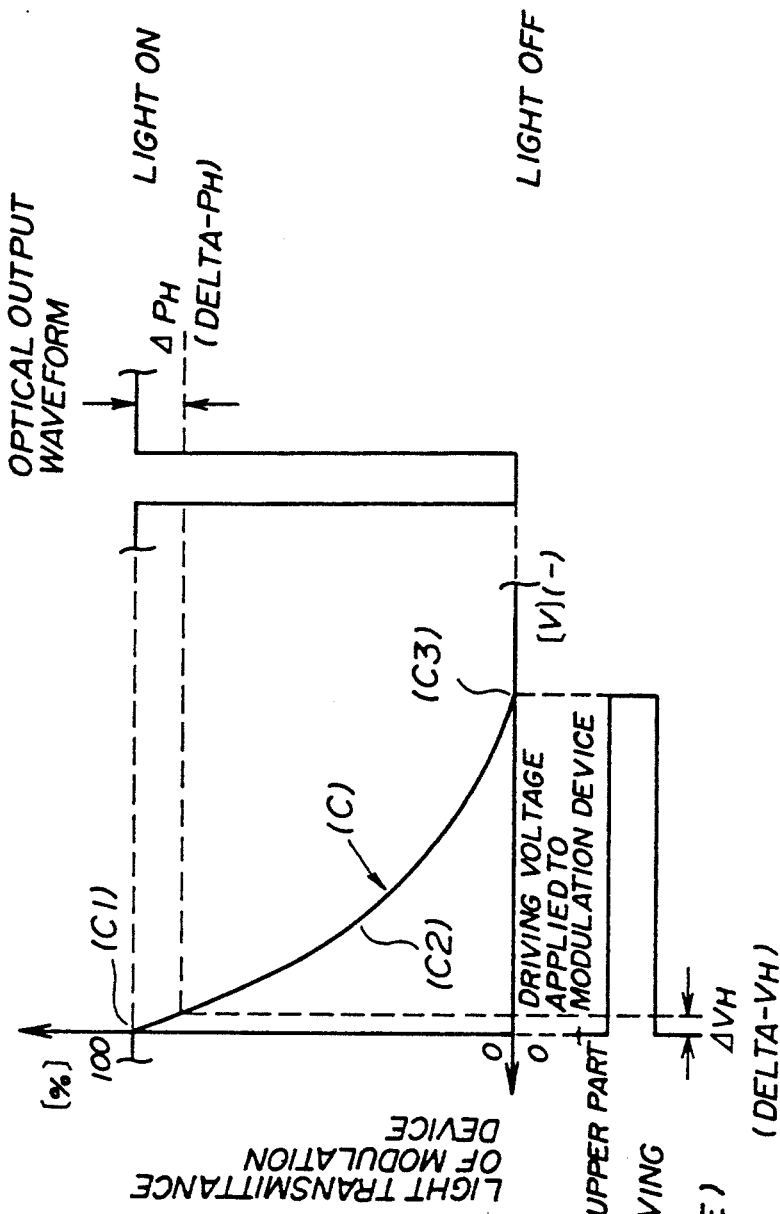

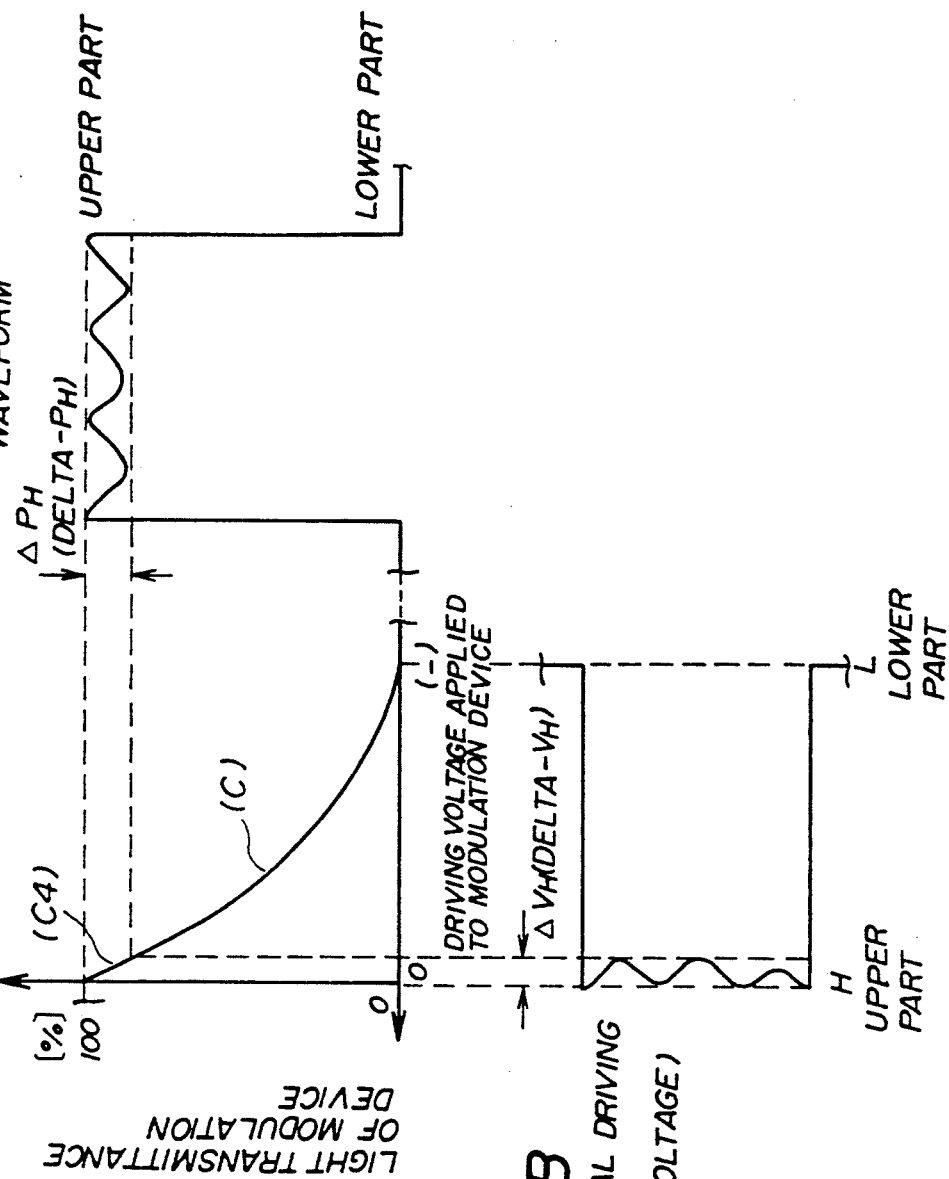

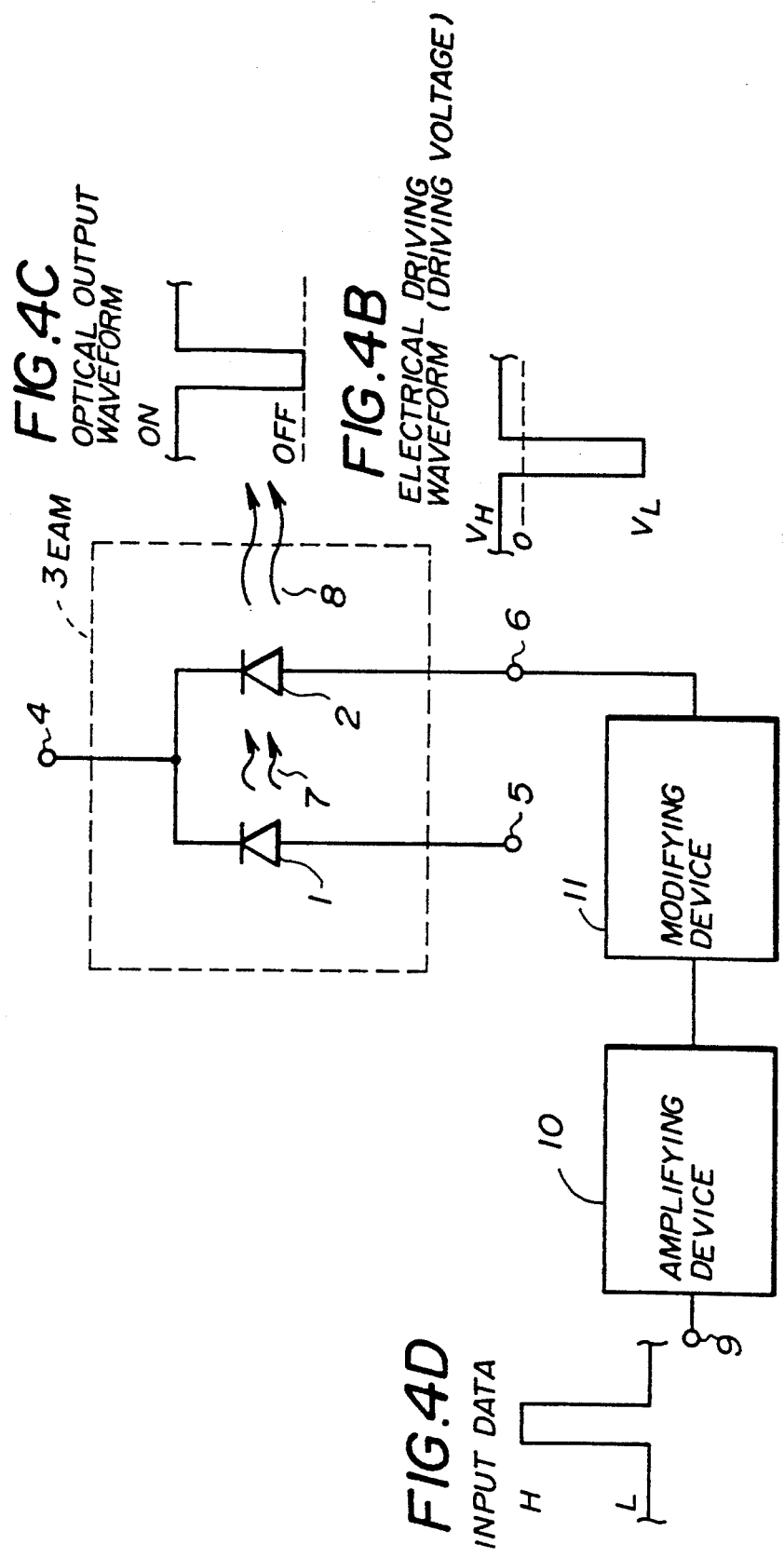

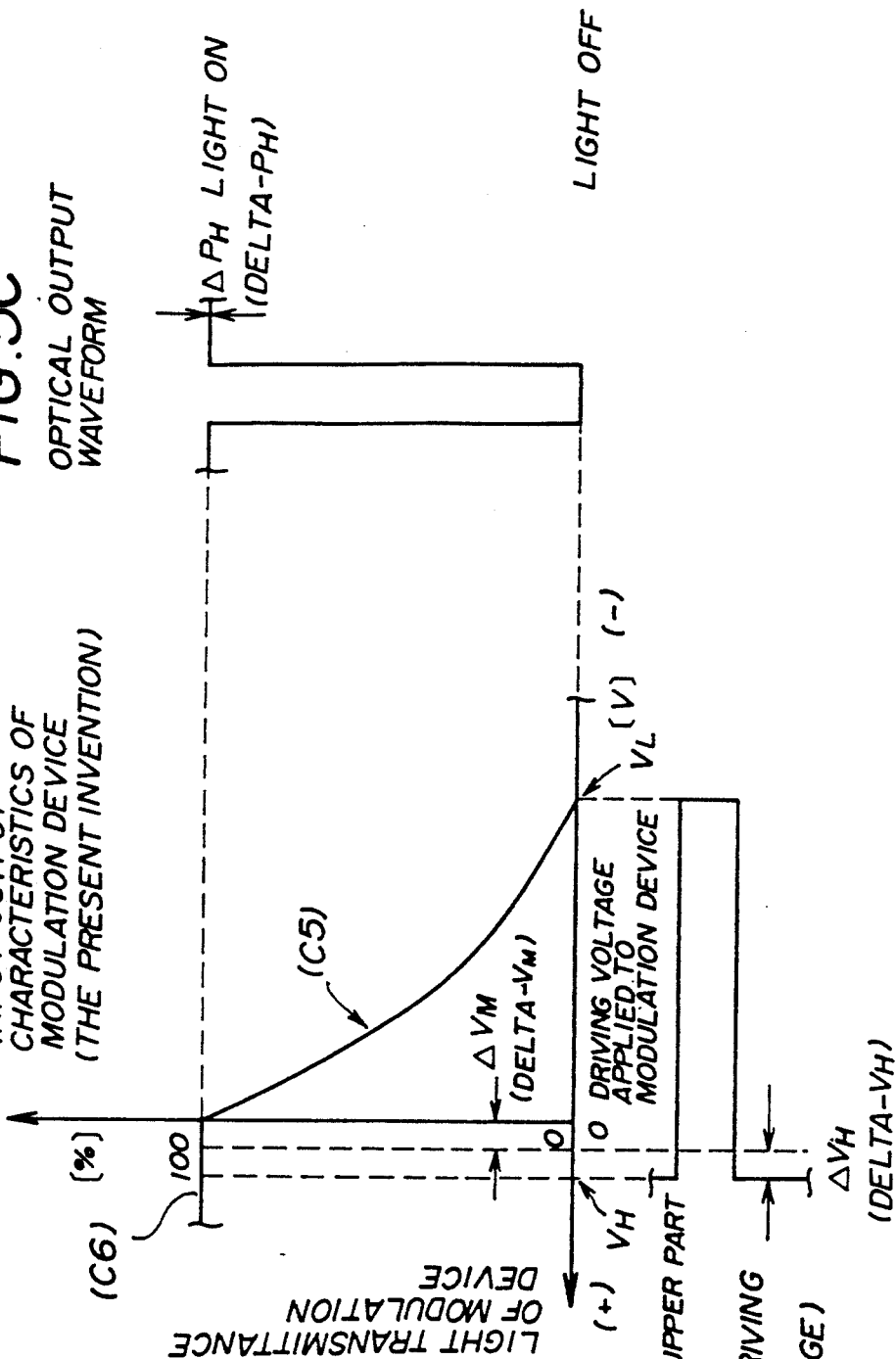

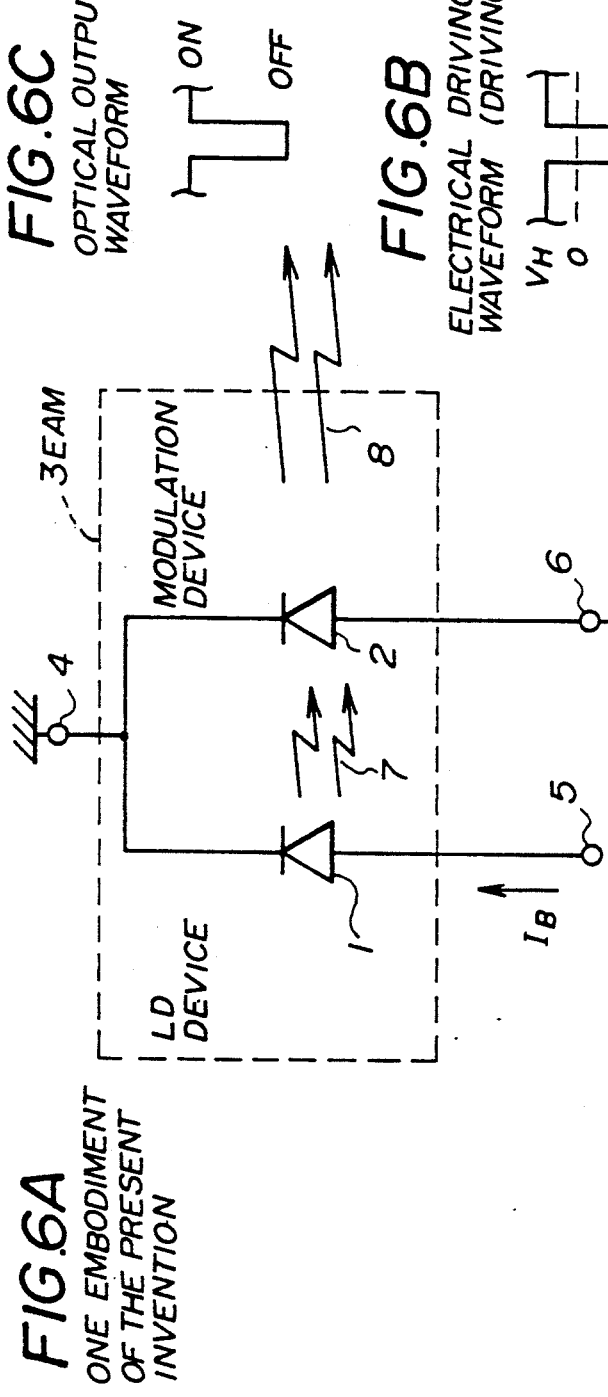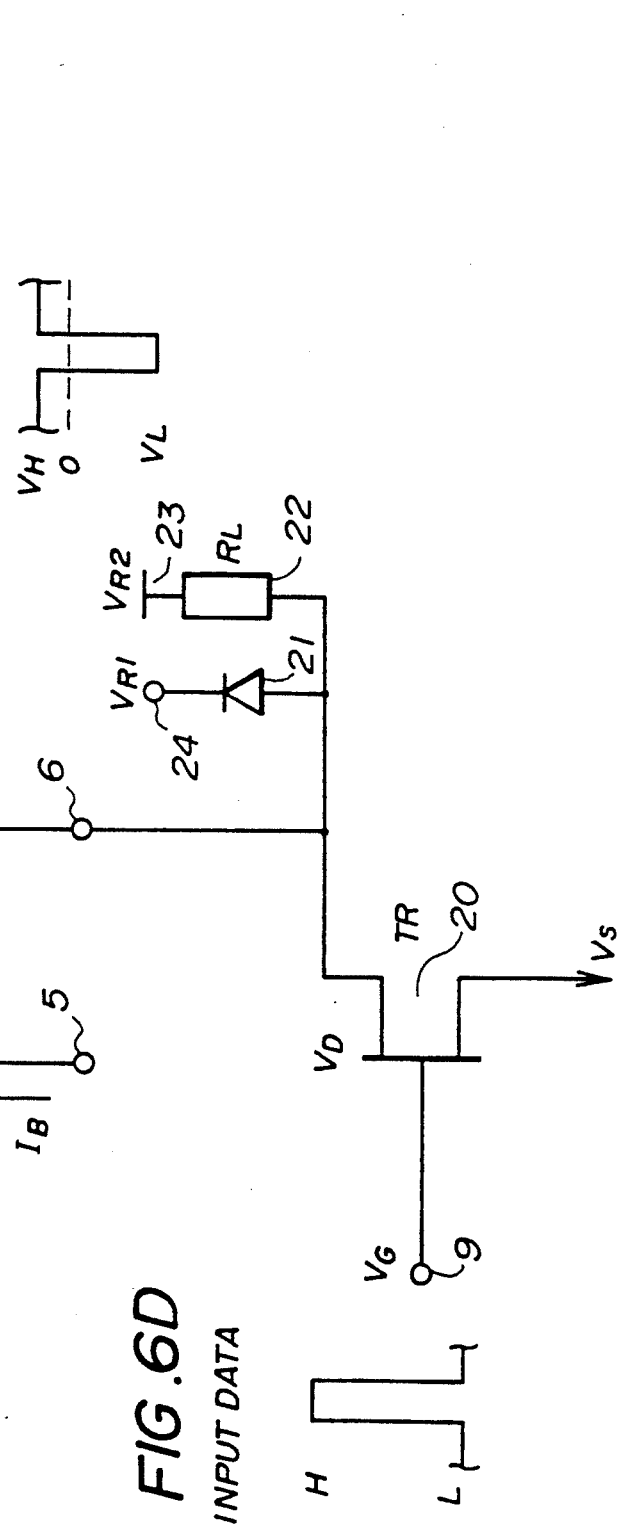

ELECTRIC FIELD ABSORPTION LIGHT MODULATION DRIVING APPARATUS AND METHOD HAVING IMPROVED FEATURE TO ELIMINATE NOISE FROM OPTICAL OUTPUT

BACKGROUND OF THE INVENTION

The present invention relates to an electric field absorption light modulation driving apparatus and method. Very fast information transmission and information transmission over a long distance are important objects achieved by a current optical communication system. For this purpose, an external modulation method instead of a direct modulation method, which may cause, for example, charping phenomena occurring in a distributed feedback laser, is required. An electric field absorption light modulation device (this is referred to as "EAM" hereinafter) is one such method fulfilling the requirement. An EAM constructed with an integrated light emission source is expected to bring about miniaturization and high performance in an apparatus relevant to the system.

The composition of an EAM driving apparatus of a related art is described below with reference to FIGS. 1A through 1C. The EAM driving apparatus comprises a laser diode device (this is referred to as "LD device" hereinafter) 1, a modulation device 2, EAM 3, a reference voltage terminal 4, a bias terminal 5, and a driving terminal 6. The LD device 1 provides a LD device output 7 to the modulation device 2, and the modulation device 2 provides a modulation device output 8.

An input-output characteristic of the modulation device 2 is described below with reference to FIGS. 2A through 2C. As is apparent from a curve (C) of FIG. 2A, the light transmittance is approximately 100% when the absolute value of the driving voltage (negative voltage) applied to the terminal 6 is zero (0) (point (C1)). Most of the light of the LD device output 7 applied to the modulation device 2, passes through modulation device 2, and appears as modulation device output 8 without experiencing significant attenuation. The LD device output 7 begins to be absorbed by the modulation device 2 at the point (C2) wherein the absolute value of the negative driving voltage begins to increase. Finally, all of the LD device output 7 is absorbed by the modulation device 2 so that the modulation device output 8 is zero (0), that is, the light is off, at the point (C3) when the absolute value of the negative driving voltage becomes equal to a predetermined value.

Therefore, an electrical driving waveform (in the negative driving voltage applied to the modulation device 2) such as shown in FIG. 2B results in an optical output waveform (in the modulation device output 8) such as shown in FIG. 2C in a case where the LD device output 7 supplied to the modulation device 2 is kept at a constant value.

There may be a case where the driving voltage applied to the modulation device 2 fluctuates in a range a delta-$V_H$ at the upper voltage (that is, small absolute value of a negative voltage) part of the driving waveform shown FIG. 3B. Such fluctuation may occur because of, for example, the high harmonics present in such a pulse wave. In the above mentioned case, the optical output (modulation device output 8) fluctuates in the range delta-$P_H$ in the upper part of the optical output waveform shown in FIG. 3C. Especially, as is shown in the curve (C), since the inclination of the curve (C) is sharp, the variation of the driving voltage is relatively amplified as a result of being converted into an optical output, in the upper part (C4). Thus, signal degradation occurs when a slight amount of ringing in an electrical driving waveform results in much higher levels of noise appearing in the upper part of the optical output. This results in a degradation of parameters such as optical receiver code-error rate and optical waveform.

Therefore, in a long-distance optical transmission system, the EAM driving apparatus in the related art has a problem in that it is not possible to utilize the advantages of an optical fiber transmission line sufficiently, which advantages are obtained as a result of its low-loss and wide-frequency-range characteristics.

SUMMARY OF THE INVENTION

A general object of the present invention is to provide EAM driving apparatus and method wherein the above mentioned problem occurring in the related art is eliminated. A particular object of the present invention is to provide an EAM driving apparatus and method wherein signal fluctuation present in an input information signal does not result in noise in the optical output of the modulation device of the EAM.

To achieve these objects, an electric field absorption light modulation driving apparatus according to the present invention comprises:

an electric field absorption light modulation unit comprising a light emission device for emitting light and a modulation device for varying a light transmittance thereof of light applied by said light emission device so as to provide said light as a result of modifying thereof; and driving signal generating means coupled with said electric field absorption light modulation unit for generating a driving signal to be applied to said modulation device from an input information signal by making said modulation device vary said light transmittance thereof, said driving signal generating means providing driving signal so that said a fluctuation range of said driving signal, in which an undesirable level fluctuation may be present, corresponds to a constant working range of said modulation device, said light transmittance thereof staying at a constant value in said constant working range.

In the above mentioned configuration, said driving signal in a fluctuation range in which an undesirable level fluctuation may be present, corresponds to a constant working range of said modulation device, said light transmittance thereof staying at a constant value in said constant working range. Thus, the undesirable fluctuation present in the input information signal does not result in any noise appearing at the optical output. Therefore, for a long-distance optical transmission system, for example in an EAM driving apparatus using the above mentioned electric field light absorption modulation driving apparatus or method, it is possible to utilize the advantage of an optical fiber transmission line sufficiently, which advantages are obtained as a result of low-loss and wide-frequency-range characteristics.

Other objects and further features of the present invention will be more apparent from the following detailed description when read in conjunction with the accompanying drawings.

BRIEF DESCRIPTION OF THE DRAWINGS

FIGS. 1A through 1C show diagrams of an EAM driving apparatus of the related art and relevant waveforms;

FIGS. 2A through 2C show diagrams of input-output characteristics of a modulation device in the related art and relevant waveforms;

FIGS. 3A through 3C show diagrams of input-output characteristics of a modulation device in the related art and relevant waveforms including an undesirable fluctuation;

FIGS. 4A through 4D show diagrams of the principle illustration for an EAM driving apparatus of one embodiment according to the present invention and relevant waveforms;

FIGS. 5A through 5C show diagrams of input-output characteristics of a modulation device in the EAM driving apparatus of one embodiment according to the present invention and relevant waveforms; and FIGS. 6A through 6D show diagrams of an EAM driving apparatus of one embodiment according to the present invention and relevant waveforms.

DESCRIPTION OF THE PREFERRED EMBODIMENT

A principle of an EAM driving apparatus of one embodiment of an electrical field absorption light modulation driving apparatus and method according to the present invention is described below with reference to FIGS. 4A through 4D. The configuration shown in FIG. 4A resulted from modifying the configuration shown in FIG. 1A. That is, an amplifying device 10 and modifying device 11 are added. Thus the description of those parts in the configuration in FIG. 4A which correspond to the parts in FIG. 1A is omitted, and the same numbers as those used for the parts in FIG. 1A are given to the corresponding parts in FIG. 4A.

A predetermined voltage is applied to a terminal 4 of the EAM 3 so that the predetermined voltage is applied to the cathodes of both the LD device 1 and the modulation device 2, and a predetermined electric current $I_B$ is supplied to the anode of the LD device 1 via a terminal 5 of the EAM 3 so that the LD device 1 emits a constant light quantity, as shown in FIG. 4A. Further, the anode of the modulation device 2 is connected to the output terminal of the modifying device 11 via a terminal 6 of the EAM 3, and the input terminal of the modifying device 11 is connected to the output terminal of the amplifying device.

The modifying device 11 or both the amplifying device and the modifying device 11 acts or act as a driving signal generating means.

An input information signal (input data as shown in FIG. 4D) supplied to the input terminal 9 of the amplifying device 10 is then amplified and inverted in the amplifying device 10. The output signal of the amplifying device 10 is then supplied to the modifying device 11. The modifying device 11 then performs the following operation on the output signal of the device 10. The upper part of the electrical driving waveform (driving voltage, acting as a driving signal) is set to a constant non-zero voltage $V_H$, as shown in FIGS. 5A through 5C. The constant voltage $V_H$, in the present invention is obtained as a result of shifting the prior art constant voltage $V_H$ from zero (0) in a positive direction (left direction in FIGS. 5A and 5B). The range between zero (0) voltage and the constant voltage $V_H$ is larger than the range obtained as a result of adding a predetermined margin range delta-$V_M$, to the range delta-$V_H$ of the expected undesirable fluctuation appearing in the H (high) level range (upper part) of the driving voltage as shown in FIGS. 5A and 5B. The predetermined margin range delta-$V_M$ is determined as the result of consideration of each relevant component used, the range of ambient temperature at which the components are used, and various factors due to aging of the components.

As is apparent from the portion (C6) of a curve (C5) of the driving voltage versus light transmittance of the modulation device 2 shown in FIG. 5A, the light transmittance of the modulation device 2 is kept at a constant value (in this embodiment, this is 100%) where a driving voltage is positive, that is, the characteristic curve (C5) has a saturation characteristic. Thus, in this range where the driving voltage is positive, the optical output is kept at a constant value in spite of any undesirable fluctuation being present in the driving voltage, under conditions where the light output applied to the modification device 2, which output is emitted from the LD device 1, is kept at a constant value.

Therefore, the range delta-$P_H$ of the level fluctuation in the optical output is zero (0) as shown by FIG. 5C even if a range delta-$V_H$ of voltage fluctuation is present in the driving voltage as shown in FIG. 5B.

That is, for example, the voltage fluctuation in a range delta-$V_H$ shown in FIG. 3B being included in the electrical driving waveform does not result in the degradation shown in FIG. 3C of the optical output waveform. The voltage fluctuation in the range delta-$V_H$ results from a corresponding level fluctuation being present in the input information signal (input data) supplied to the amplifying device 10. Thus, there results in no degradation of the light receiver code-error rate.

A configuration of the EAM driving apparatus of the embodiment of electrical field absorption light modulation driving apparatus and method according to the present invention is described below with reference to FIGS. 6A through 6D. The configuration in FIG. 6A shows concrete forms of the amplifying device 10 and modifying device 11 shown in FIG. 4A. Thus the description of those parts in FIG. 6A which correspond to the parts in FIG. 4A is omitted, and the same numbers as those used for the parts in FIG. 4A are given to the corresponding parts in FIG. 6A. The terminal 4 of the EAM, that is, the cathodes of both the LD device 1 and the modulation device 2, is grounded in this configuration as shown in FIG. 6A.

A transistor 20 (acting as an active element and being as a first pn junction element) acts to amplify and invert an input data waveform a diode (being as a second pn junction element) 21 acts to modify the waveform, that is, to shift the level of the waveform, and a load resistor (acting as a load element) acts as load for the transistor 20. The diode 21 acts as a constant voltage providing means.

A voltage $V_G$ corresponding to an input information signal (input data) is supplied to the gate of the transistor 20, a negative voltage $V_S$ is applied to a source of the transistor 20, and a voltage $V_D$ at the drain of the transistor 20 is applied to the terminal 6 of the EAM, that is, to the anode of the modulation device 2. The anode of the diode 21 is connected to the terminal 6 of the EAM 3, and a positive first reference voltage $V_{R1}$ is applied to the cathode (24) of the diode 21. One terminal of the resistor 22 is connected to the terminal 6 of the EAM 3, and a positive second reference voltage $V_{R2}$ is applied to the other terminal of the resistor 22.

The operation of the transistor 20, the diode 21 and resistor 22 are described below.

The transistor turns "ON" when the level of the input information signal (input data) goes high (H). Thus, the output voltage $V_D$ of the transistor 20 goes low. The present voltage $V_D$ is previously set to a voltage $V_L$ which is the negative bias voltage of the EAM 3, that is, which voltage causes the light transmittance of the modulation device 2 to be zero (0) % as shown in FIG. 5A. Thus, the optical output of the modulation device of the EAM 3 is "OFF", that is, L (low) level shown FIG. 6C when the level of the input information signal (input data) is H (high) level shown in FIG. 6D.

The transistor 20 turns "OFF" when the level of the input information signal (input data) is L (low). Then, the voltage at the anode (6) of the modulation device 2 becomes a constant value which is determined by the first and second reference voltages $V_{R1}$ and $V_{R2}$, characteristics of the diode 21, and the resistance value of the resistor 22. The present constant value is previously set to the above mentioned positive constant voltage $V_H$ shown in FIG. 5A.

The H (high) level range of the driving voltage corresponds to a range of the light transmittance of the modulation device 2, in which range the light transmittance is in a saturated condition. Thus, an optical output waveform should not contain noise, that is, the level fluctuation delta-$P_H$ appearing in the H (high) level range should be zero (0) as show in FIG. 5C.

An advantage of the present invention is described below. As a result of the above mentioned operation for the embodiment according to the present invention, the level fluctuation, corresponding to the undesirable level fluctuation occurring in a driving voltage applied to the modulation device, appearing in the H level range of an optical output is suppressed even if the undesirable level fluctuation occurs in the H level range of the driving voltage. Thus, occurrence of noise in the H level range of the optical output, which occurrence results from slight degradation such as ringing in the electrical driving waveform is prevented. This results in prevention of degradation of the light receiver code-error rate and of the optical waveform. Therefore, it is possible to utilize the advantage of an optical fiber transmission line sufficiently, which advantage is obtained as a result of low-loss and wide-frequency-range characteristics.

Further, the present invention is not limited to the above mentioned embodiments, and variations and modifications may be made without departing from the scope of the present invention.

What is claimed is:

1. An electric field absorption light modulation driving apparatus comprising:
    an electric field absorption light modulation unit comprising a light emission device for emitting light and a modulation device for varying a light transmittance thereof of light applied by said light emission device so as to provide said light as a result of modifying thereof; and
    driving signal generating means, responsive to an input information signal, for generating a driving signal to be applied to said modulation device, said modulation device varying said light transmittance thereof in response to said driving signal level, said driving signal generating means providing said driving signal so that a portion of a driving voltage of said driving signal, in which an undesirable level fluctuation occurs, corresponds to a constant working range of said modulation device; said constant working range characterized by a constant value of light transmittance of said modulation device.

2. The electric field absorption light modulation driving apparatus according to claim 1, wherein said driving means comprises level setting means for setting a level of said driving signal so that said portion of the driving voltage of said driving signal corresponds to said constant working range of said modulation device.

3. The electric field absorption light modulation driving apparatus according to claim 2, wherein said level setting means provides a predetermined margin range, and adds said margin range to said portion of the driving voltage to determine said level of said driving signal.

4. The electric field absorption light modulation driving apparatus according to claim 2, wherein said driving signal generating means further comprises amplifying means, coupled with said level setting means, for amplifying said input information signal, said amplifying means then inverting level variation of said input information signal, and said amplifying means then providing amplified and inverted said input information signal to said level setting device.

5. The electric field absorption light modulation driving apparatus according to claim 4, wherein said amplifying means comprises an active element having an input terminal at which said input information signal is applied, an output terminal connected to said modulation device of said electric field absorption light modulation unit, and a bias terminal at which a bias voltage being applied, said active element connecting said output terminal and said bias terminal thereof to each other when a predetermined first level of said input information signal is applied to said input terminal thereof so as to provide said driving signal to said modulation device, said output voltage being the same as said bias voltage, and said active element disconnecting said output terminal from said bias terminal thereof when a predetermined second level of said input information signal is applied to said input terminal thereof.

6. The electric field absorption light modulation driving apparatus according to claim 5, wherein said active element comprises a pn junction element having a gate acting as said input terminal, a source acting as said output terminal, and a drain acting as said bias terminal.

7. The electric field absorption light modulation drive apparatus according to claim 5, wherein said amplifying means further comprises a load element connected to said output terminal of said active element for generating a predetermined voltage therein when electric current flows through said load element while said output terminal and said bias terminal of said active element are connected and said electric current flows through said active element.

8. The electric field absorption light modulation driving apparatus according to claim 2, wherein said level setting means comprises constant voltage providing means for providing a constant voltage to said modulation device of said electric field absorption light modulation unit so as to make said portion of the driving voltage of said driving signal correspond to said constant working range of said modulation device when said output terminal of said active element is disconnected from said bias terminal.

9. The electric field absorption light modulation driving apparatus according to claim 8, wherein said constant voltage providing means comprises a one-direction-current-flowing device having an anode and a cathode for allowing current to flow in a direction from said anode to said cathode when a voltage higher than another voltage applied to said cathode is applied to said anode, wherein a reference voltage applied to said cathode of said one-direction-current-flowing device produces said constant voltage at said anode of said one-direction-current-flowing device, said anode being connected to said modulation device of said electric field absorption light modulation unit.

10. The electric field absorption light modulation driving apparatus according to claim 9, wherein said one-direction-current-flowing device comprises a pn junction element having an anode acting as said anode of said one-direction-current-flowing device and a cathode acting as said cathode of said one-direction-current-flowing device.

11. The electric field absorption light modulation driving apparatus according to claim 1, wherein said modulation device has a maximum light transmittance in said constant working range.

12. The electric field absorption light modulation driving apparatus according to claim 1, wherein a total amplitude range of said driving signal comprises a positive range and a negative range, wherein said positive range includes said portion of the driving voltage, and said negative range corresponds to a variation working range of said modulation device, where said light transmittance of said modulation device varies in response to variation of said driving signal.

13. The electric field absorption light modulation driving apparatus according to claim 1, wherein:
said light emission device and said modulation device of said electric field absorption light modulation means respectively have anodes and cathodes, and said cathode of said light emission device is connected to the cathode of said modulation device of said electric field absorption light modulation means; and
said driving signal generating means comprises a first pn junction element having a gate, a source, and a drain, and a second pn junction element having an anode and a cathode, said input information signal being supplied to said gate of said first pn junction element, a bias voltage being applied to said source of said first pn junction element, the anode of said modulation device of said electric field absorption light modulation device being connected to said drain of said first pn junction element, said anode of said modulation device of said electric field absorption light modulation means being connected to the anode of said second pn junction element, and a first reference voltage being supplied to the cathode of said second pn junction element.

14. The electric field absorption light modulation driving apparatus according to claim 13, wherein said driving signal generating means further comprises a load element for said first pn junction element, said anode of said second pn junction element being connected with one terminal of said load element, and a second reference voltage being applied to another terminal of said load element.

15. An electric field absorption light modulation driving method comprising steps of:
(a) making a light emission device emit light and (b) making a modulation device vary a light transmittance thereof of light applied by said light emission device so as to provide said light as a result of modifying thereof; and
(c) generating a driving signal from an input information signal, and applying said driving signal to said modulation device thereby making said modulation device vary said light transmittance thereof, step (c) providing said driving signal so that a portion of the driving voltage of said driving signal, in which an undesirable level fluctuation occurs, corresponds to a constant working range of said modulation device; said constant working range characterized by a constant value of light transmittance of said modulation device said light transmittance thereof staying at a constant value in said constant working range.

16. The electric field absorption light modulation driving method according to claim 15, wherein said step (c) comprises a step of (c-1) setting a level of said driving signal so that said a portion of the driving voltage of said driving signal corresponds to said constant working range of said modulation device.

17. The electric field absorption light modulation driving method according to claim 16, wherein said step (c-1) provides a predetermined margin range, and adds said margin range to said fluctuation range to determine said level of said driving signal.

18. The electric field absorption light modulation driving method according to claim 16, wherein said step (c) further comprises steps of (c-2) amplifying said input information signal, then (c-3) inverting level variation of said input information signal, and then (c-4) providing amplified and inverted said input information signal to said step (c-1).

19. The electric field absorption light modulation driving method according to claim 15, wherein said modulation device has a maximum light transmittance in said constant working range.

20. The electric field absorption light modulation driving method according to claim 15, wherein a total amplitude range of said driving signal comprises a positive range and a negative range, wherein said positive range includes said portion of the driving voltage, and said negative range corresponds to a variation working range of said modulation device, where said light transmittance of said modulation device varies in response to variation of said driving signal.

* * * * *

UNITED STATES PATENT AND TRADEMARK OFFICE
CERTIFICATE OF CORRECTION

PATENT NO. : 5,317,581
DATED : May 31, 1994
INVENTOR(S) : Onishi, et al.

It is certified that error appears in the above-indentified patent and that said Letters Patent is hereby corrected as shown below:

Column 4, line 53. after "waveform" insert --.--.

Column 4, line 53, delete first occurrence "a" and insert --A--.

Signed and Sealed this

Second Day of May, 1995

Attest:

BRUCE LEHMAN

*Attesting Officer*    *Commissioner of Patents and Trademarks*